United States Patent
Hopkins et al.

(10) Patent No.: US 10,589,286 B2
(45) Date of Patent: Mar. 17, 2020

(54) EFFICIENTLY SANITIZING A SOLID STATE DRIVE (SSD)

(71) Applicant: Akamai Technologies, Inc., Cambridge, MA (US)

(72) Inventors: Brandon J. Hopkins, Cambridge, MA (US); Kevin A. Riggle, Somerville, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 998 days.

(21) Appl. No.: 14/831,370

(22) Filed: Aug. 20, 2015

(65) Prior Publication Data

US 2017/0050190 A1    Feb. 23, 2017

(51) Int. Cl.
*B02C 23/06* (2006.01)
*B02C 23/12* (2006.01)
(Continued)

(52) U.S. Cl.
CPC .......... *B02C 23/06* (2013.01); *B02C 18/12* (2013.01); *B02C 18/143* (2013.01);
(Continued)

(58) Field of Classification Search
CPC ..... B02C 23/06; B02C 18/143; B02C 18/144; B02C 18/12; B02C 18/0084; B02C 25/00;
(Continued)

(56) References Cited

U.S. PATENT DOCUMENTS 5,310,285 A * 5/1994 Northcott ............... B09B 1/008
166/305.1
8,715,765 B2 * 5/2014 Myers ..................... A23K 1/001
426/454

(Continued)

FOREIGN PATENT DOCUMENTS

CN      204093500 U     1/2015
JP      2014166599 A    9/2014

OTHER PUBLICATIONS

Blendtec Youtube (https://www.youtube.com/watch?v=IAl28d6tbko)—Apr. 5, 2010.*

(Continued)

*Primary Examiner* — Shelley M Self
*Assistant Examiner* — Smith Oberto Bapthelus
(74) *Attorney, Agent, or Firm* — David H. Judson

(57) ABSTRACT

A low-cost, portable, destructive sanitization method for solid state drives (SSDs) is provided. Preferably, an SSD is destroyed by disintegration within a given time period (approximately 30 minutes or less) using a blending device operating at a given peak power, e.g., greater than 450 W. A pulverizing agent may be admixed with pieces of an SSD printed circuit board prior to initiating the disintegration process to increase the number of particle collisions in a processing/blending chamber. The pulverizing agent may also contain moisture that mitigates suspension of processed SDD particles in the surrounding air (when the mixing chamber is opened). The overall process may be video-recorded for compliance purposes.

19 Claims, 2 Drawing Sheets

(51) Int. Cl.
*B02C 18/12* (2006.01)
*B02C 19/00* (2006.01)
*B02C 25/00* (2006.01)
*G06F 21/79* (2013.01)
*B09B 3/00* (2006.01)
*B02C 18/14* (2006.01)
*B02C 18/00* (2006.01)

(52) U.S. Cl.
CPC ............ *B02C 18/144* (2013.01); *B02C 23/12* (2013.01); *B02C 25/00* (2013.01); *B09B 3/00* (2013.01); *G06F 21/79* (2013.01); *B02C 18/0084* (2013.01); *B02C 19/00* (2013.01); *B02C 2018/0015* (2013.01); *G06F 2221/2143* (2013.01); *Y02W 30/822* (2015.05)

(58) Field of Classification Search
CPC ...... B02C 23/12; B02C 19/00; Y02W 30/822; B09B 3/00; G06F 21/79; G06F 2221/2143
USPC ............................................ 241/22, 3, 101.4
See application file for complete search history.

(56) References Cited

U.S. PATENT DOCUMENTS

| | | | |
|---|---|---|---|
| 8,794,559 B1 | 8/2014 | Ebadian et al. | |
| 8,912,751 B2* | 12/2014 | Suzuki | H01M 2/1055 320/107 |
| 2001/0030251 A1* | 10/2001 | Ueno | B09B 3/00 241/23 |
| 2004/0112996 A1* | 6/2004 | Villwock | B02C 23/06 241/22 |
| 2004/0181923 A1* | 9/2004 | Dills | B03B 9/061 29/403.3 |
| 2007/0108321 A1* | 5/2007 | Booth | B02C 13/284 241/19 |
| 2011/0286173 A1* | 11/2011 | Moore | G06F 1/187 361/679.31 |
| 2013/0337131 A1* | 12/2013 | Myers | A23K 1/001 426/418 |
| 2014/0208965 A1* | 7/2014 | Noblitt | F23G 7/003 100/99 |
| 2014/0263216 A1 | 9/2014 | Clark et al. | |

OTHER PUBLICATIONS http://www.intelfreepress.com/news/pushing-the-limits-of-solid-state-technology/172/, "Pushing the Limits of Solid-State Technology", Intel Free Press, Dec. 15, 2011.
http://willitblend.com/categories/view/1, iPhone3G, Aug. 2015.
http://blog.lifespantechnology.com/it-asset-disposition-blog/bid/316009/What-the-Latest-Standards-for-Data-Destruction-have-to-Say-About-SSDs, "What the Latest Standards for Data Destruction have to Say about SSDS", Cindy Miller, Sep. 17, 2013.
http://nvlpubs.nist.gov/nistpubs/SpecialPublications/NIST.SP.800-88r1.pdf, "Guidelines for Media Sanitization", Special Publication 800-88, Revision 1, Dec. 2014.
http://www.pcworld.com/article/2921590/death-and-the-unplugged-ssd-how-much-you-really-need-to-worry-about-ssd-reliability.html, "Death and the Unplugged SSD: How much you really need to worry about data retention", Jon L. Jacobi, May 13, 2015.
http://www.blendtec.com/use-and-care, Customer Use and Care Instructions, Aug. 2015.
PCT/US2016/048024, Written Opinion of the International Searching Authority, dated Nov. 28, 2016, 6 pages.

* cited by examiner

EFFICIENTLY SANITIZING A SOLID STATE DRIVE (SSD)

BACKGROUND

Technical Field

This disclosure relates generally to techniques for sanitizing solid state drives (SSDs).

Background of the Related Art

To ensure the security of information stored on SSDs, National Security Agency (NSA) guidelines for the SSD sanitization mandate that SSD circuit boards be pulverized into powder consisting of particles smaller than 2 mm along their longest dimensions. Current hammer mill machines used to sanitize SSDs are expensive (on the order of $65,000), not portable (1 m$^3$, 1,150 lbs), and they can pose health, environmental and information-security risks. While there are third party services that can be used for destruction, the cost per SSD can be prohibitive when only a small number of drives are being destroyed.

There remains a need in the art to provide improved SSD sanitization for asset security, in a cost-effective, reliable and repeatable manner.

BRIEF SUMMARY

According to this disclosure, a low-cost, portable, destructive sanitization method for solid state drives (SSDs) is provided. Preferably, an SSD is destroyed by disintegration within a given time period (approximately 30 minutes or less) using a blending device operating at a given peak power, e.g., greater than 450 W. Preferably, a pulverizing agent is admixed with pieces of an SSD printed circuit board prior to initiating the disintegration process to increase the number of particle collisions in a processing/blending chamber. The pulverizing agent may also contain moisture that additionally mitigates suspension of processed SDD particles in the surrounding air (when the mixing chamber is opened). The overall process may be video-recorded for compliance purposes.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

The basic method of this disclosure is used to disintegrate or pulverize (and thus destroy) a solid state drive (SSD) printed circuit board (PCB) into powder less than 2 mm along a longest length.

Figure 1:
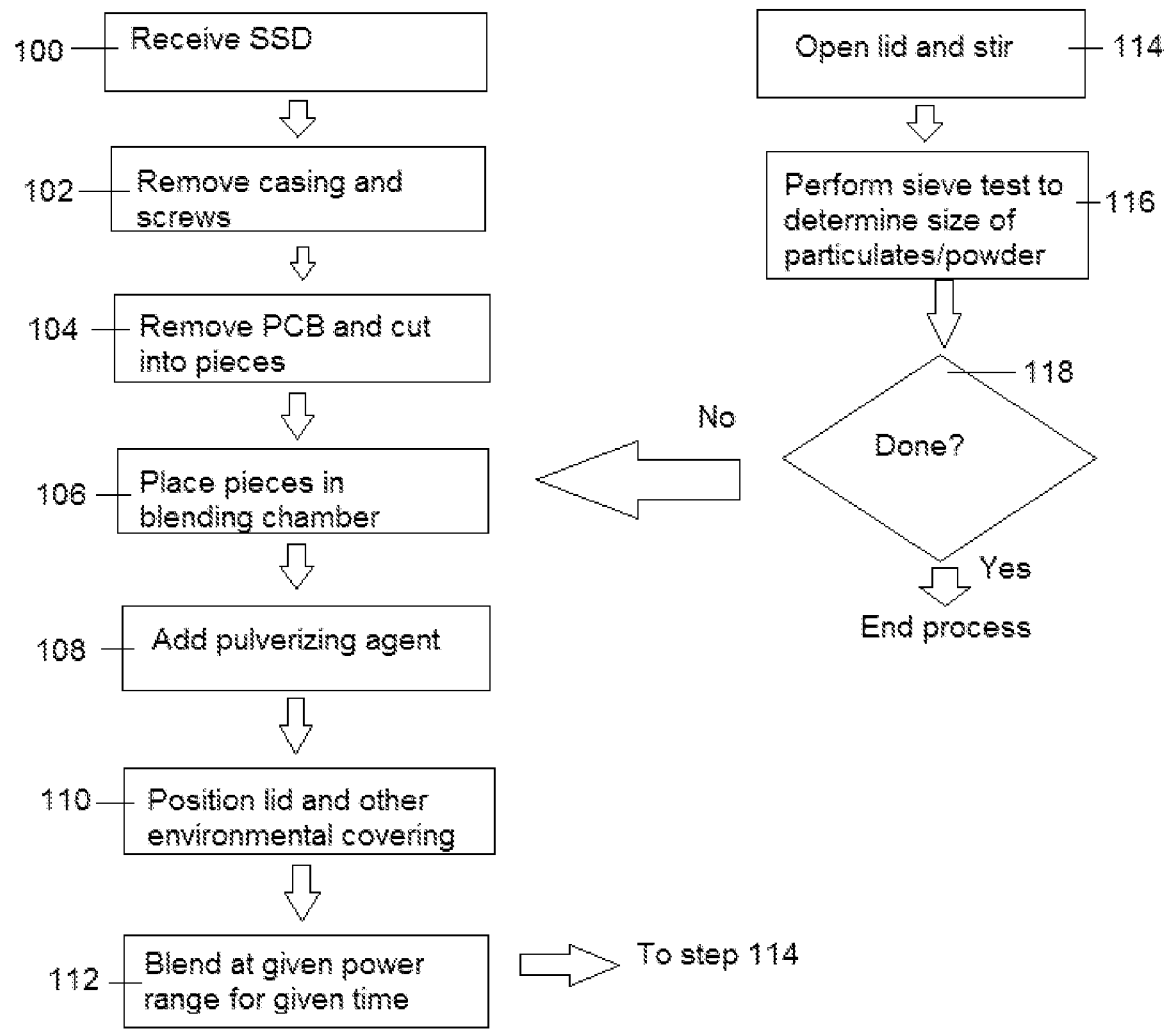
FIG. 1 depicts a process flow of a drive destruction method of this disclosure.

FIG. 1 depicts a representative process flow. Not all steps are required, and the order of the steps may be varied. Or, multiple steps may be combined.

The process begins at step 100 upon receipt for destruction of an SSD. At step 102, the casing and screws of the SSD are removed. At step 104, the PCB is removed and cut up into pieces that are approximately 2-3 cm. At step 106, the pieces are placed in a blending chamber of a blending device or food processor (hereinafter, a "blender"). At step 108, a pulverizing agent is add to the blending chamber to create an admixture of the SSD PCB pieces and the pulverizing agent. Step 108 may be carried out before step 106. The pulverizing agent adds volume to the mixture to increase blending efficiency, as well as to add moisture to the mixture to ensure that particulates (a powder suspension) do not readily escape into the air when a blending chamber lid is removed. At step 110, the blender lid is positioned to close the blending chamber. If needed, duct tape or the like may be used to seal any exposed opening in the lid. At step 112, the blender is activated to cut the PCB pieces (using the internal blades). The blending time will vary depending on the blade properties (e.g., sharpness), as well as the power and rotational blade speed of the device. After blending for a given time (e.g. one or more minutes), the blender is stopped. At step 114, the lid is opened and the contents in the blender stirred (e.g., with a brush). The process is then iterated. In particular, following an iteration, the powder is placed in a sieve to ensure proper size. This is step 116. If there are particles greater than a certain size (e.g., 2 mm) remaining (as indicated by a negative outcome of the sieve test at 118), preferably all of the powder, including the still-oversized particles, are placed back in the blender for another blending iteration. Thus, as indicated in FIG. 1, the process returns to step 106. During a subsequent iteration, step 108 (adding the pulverizing agent) may be omitted. Preferably, the process repeats until all the particles pass through the sieve. This is a positive outcome of the test at step 118.

Thus, according to a preferred approach, when (after a given iteration) the pieces of the SSD are still too big after filtering, all of the particles are placed back in the blender and potentially more pulverizing agent may be added to the admixture.

One or more SSDs may be processed at the same time.

To destroy a 1.8" SSD or 2.5" SSD in approximately 30 minutes or less, a blender should have a peak power greater than 450 W. By using a motor sizing approximation equation for machining, power P required$\approx$n*Us*V$_{SSD}$/t, where n is a factor of safety approximately equal to 2, Us is the specific energy of copper (approximately equal to 3 J/mm$^3$), VSSD is the volume of the SDD (approximately 23,000 mm$^3$), and t is the time to machine the SSD (with an acceptable range of 1 to 10 min), a motor with a power range of 240 W to 2,400 W could be utilized. Household blending devices and food processors have motors that fall into this power range. While this is the preferred power range, the technique of this disclosure may be practiced with a blender having an even higher power (e.g., 2,900 W). Blenders are also designed to reduce volumes the size of 1000 cm$^3$ or greater to particles approximately 1 mm$^3$ or smaller. In general, the greater the peak power, peak blade speed, and blade sharpness, the faster the SSD can be disintegrated.

Without intending to be limiting, and using the technique, a 1.8" SSD can be properly disintegrated in a blender with peak power >450 W in less than 20 min. A 2.5" SSD can be properly disintegrated in a blender with peak power >1000 W in less than 20 min. If the time is extended to approximately 30 minutes in a blender with >450 W power, a 2.5" SSD can also be properly destroyed.

Thus, preferably an approach for disintegrating an SSD utilizes a blender having a motor with a peak operating power greater than 450 W. Preferably, a sieve is used to ensure that resulting processed powder is appropriately sized, i.e. the longest edge of a particle is smaller than 2 mm. Preferably, the processing/blending chamber is translucent or transparent to allow for easy video recording of the destruction process. Preferably, a pulverizing agent is added into the blending chamber prior to at least the first iteration. The pulverizing agent preferably is a hard and brittle material that contains some moisture. An example agent is a corn-based filler material such as popcorn seeds. When added to the blend, the pulverizing agent increases the number of particle collisions in the processing/blending chamber, and it mitigates suspension of processed SDD particles in the surrounding air (when the mixing chamber is opened). Indeed, a slight amount of particle clumping reduces that amount of powder that is suspended in the air when the processor/blender lid is opened. This is desirable, as SSDs can contain lead or other heavy metals and toxic substances. Mitigating particle suspension in the air decreases the risk that the processor/blender operator will inhale the toxic particles. The pulverizing agent may comprise a plurality of agents, one that is hard and brittle, and another that adds moisture. Popcorn seeds serve both functions at once. Preferably, the processing/blender chamber is covered with a lid so that when the processing chamber is opened, suspended SSD material is directed away from the operator's face.

Preferred blenders include, e.g., Oster # BLSTVB-RV0, Vita-Mix # VM0102, Ninja # BL800 30 and Blendtec # CTB2. These machines typically vary in one or more characteristics such as power draw, blade configuration and degree of sharpness/bluntness, blending chamber/mixing volume, and the like. Sharp blades typically provide better results than duller blades. Sharper blades allow for the use of a lower horsepower motor, and such blades cut the larger ductile pieces into acceptably small pieces relative to blenders that use higher horsepower but blunter blades.

Thus, for example, the Ninja Ultima (1500 W or 2 horsepower, sharp blades) turned an SSD into powder smaller than 2 mm in less than 12 minutes. When sharp blades are used in the blender, power draw between or at 1000 W-1500 W is preferred. When duller blades are used (e.g., the Blendtec Classic) 1500 W is on the low side for power but can produce the desired results. More expensive Blendtec blenders operate at higher power and may be used as well. The Vitamix blender (1380 W, sharp blades) can turn the SSD into powder in less than 3 minutes.

Generalizing, lower-end blenders (e.g., from Blendtec and Viatmix) are able to pulverize SSDs, but the Viatmix performs better (processed SSD in less than 3 min, as opposed to 15 min or 20 min with the Blendtec) for this application, presumably due to the use of the sharper blades.

Preferably, rotational blade speeds will be between approximately 21,000-29,500 RPM. Preferably, processing time is less than 120 min per SSD batch (1 or possibly up to 50 SSDs), with a preferred time being no more than 10 to 20 minutes for 1 SSD. A hand tool may be used to manually dislodge large pieces to ensure a more uniform blend in between blending cycles. Adding a pulverizing agent (e.g., popcorn seeds) to the chamber increases processing or blending efficiency, and increases moisture of the resulting powder, thereby decreasing the amount of powder that is suspended in the air when the processor or blender lid is opened. This is important for safety because the powder if inhaled can be toxic. The popcorn has just enough moisture to make the powder stick but not too much that the moisture inhibits the SDD particles from hitting the blade enough times. Preferably, the chamber is covered with a lid during the blending operation so that when the processing chamber is opened, suspended SSD material is directed away from the operator's face.

Other disintegrating agents (i.e. other than popcorn) may be used in the process to decrease disintegration time and to facilitate powder clumping so that powder is not suspended in the air upon opening the blender or food processor lid. Popcorn is a good additive because it is hard and brittle but is not harder than the stainless steel blades found in blenders and food processors. Other low cost food-stuffs include rice. Using popcorn seeds or other additives to increase blending efficiency enables use of a lower cost blender to disintegrate an SSD but still achieve a processing time similar to that achievable using a higher cost blender without using popcorn seeds.

Preferably, the SSD disintegration process is visually recorded for compliance reporting and auditing purposes. The recording may be done automatically and integrated with other automated systems.

An SSD destruction kit comprising the blender (a blender such as identified above, or a food processor) and the associated items fits within a small carrying case (e.g., a conventional backpack).

Figure 2:
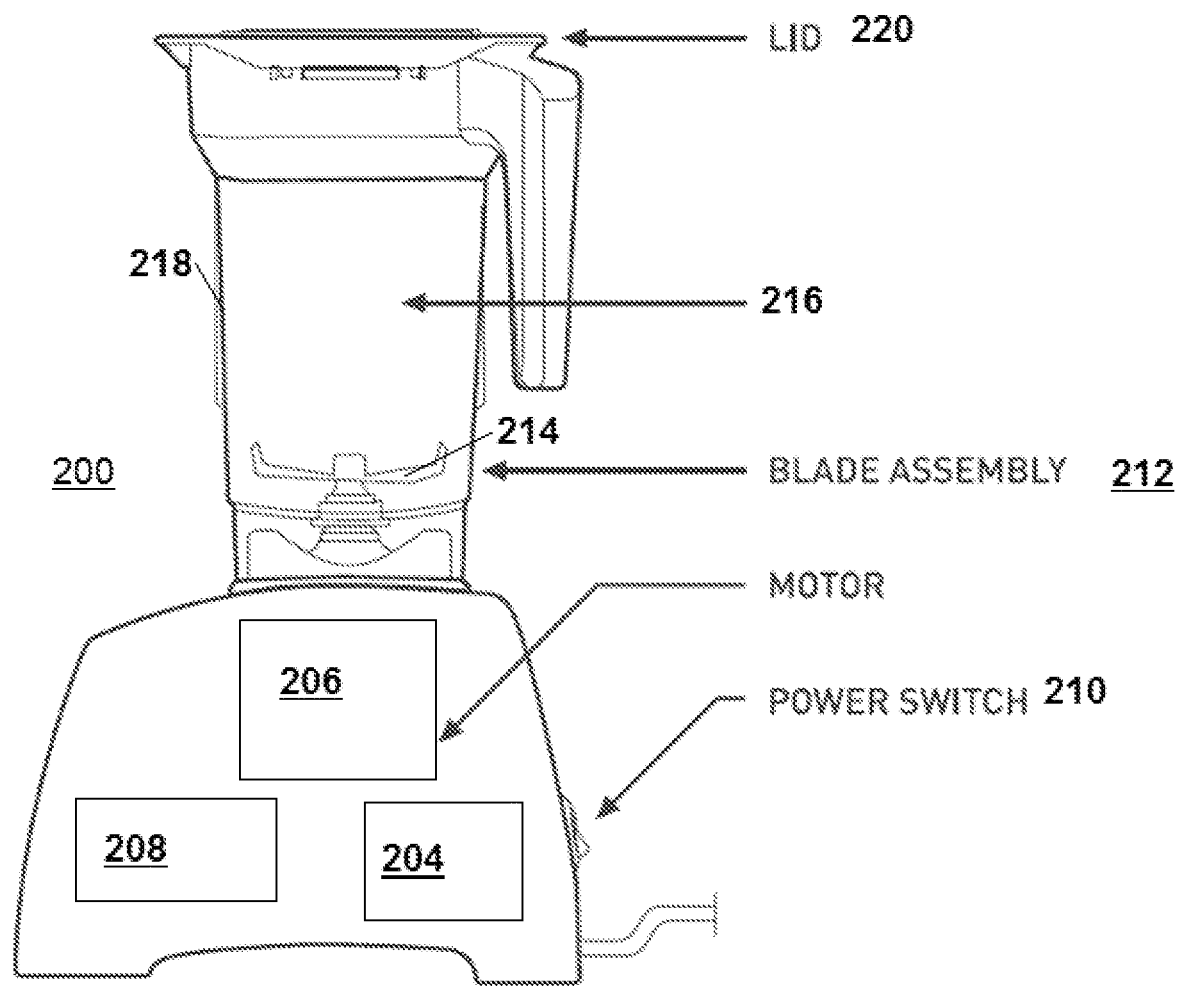
FIG. 2 depicts a blender that may be used in the drive destruction method of this disclosure.

FIG. 2 is a side view of a motor base and jar assembly of an off-the-shelf blender that may be used in the SSD destruction process of this disclosure. The blender 200 comprises a motor base 202 that encloses the unit's power supply 204, motor 206, and associated control electronics 208. The unit is powered on using the power switch 210. The motor 206 drives a blade assembly 212 comprising blades 214. A blending chamber 216 is formed within a removable jar that includes translucent or transparent sides 218. Typically, the jar is formed of glass or a rigid polymeric material.

The subject matter has numerous advantages over the prior art. Enterprises often need to securely destroy SSDs periodically (or frequently) as computers and other machines are de-commissioned, replaced or repaired. At low volumes, however, prior art destruction methods are very expensive. The technique of this disclosure is low-cost, portable, safe and secure, and it provides an efficient and reliable way to turn SSDs into particles smaller than 2 mm, as dictated by NSA guidelines. The approach preferably uses an off-the-shelf commercial blender that comprises a transparent work zone in which the SSD is pulverized.

As another variant, a glove bag (or the like) is used to cover a blender that is used to disintegrate SSDs. The glove bag acts as an environmental seal. As noted above, SSDs contain harmful materials such as lead and other heavy metals. Inhaling such materials can be toxic. The glove bag need not be airtight as the goal is simply to decrease the number of particles the operator inhales during the disintegration process. Including the glove bag enables the disintegration kit to be smaller, lighter, and consequently more portable.

The technique of this disclosure is highly advantageous where the destruction requirements are relatively modest, e.g., in the personal, individual, consumer-grade market space.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The techniques herein may be extended to disintegrate a variety of memory storing media, such as thumb drives, CDs, DVDs, or other computational devices such as hardware security modules (HSMs).

Having described our invention, what we now claim is as follows:

1. A method to destroy a solid state drive (SSD) printed circuit board (PCB) for information security, comprising:
   admixing an SSD PCB together with a pulverizing agent to create an admixture;
   blending, for a given time period, and within a blending chamber of a blender, the admixture to form a particulate powder, wherein the blending is carried out over a given power range of the blender;
   following the given time period, placing the particulate powder in a sieve having openings of a given size, wherein particulates of the particulate powder less than the given size pass through the sieve;
   repeating at least the blending operation until such time as no particulates greater than the given size exist in the admixture;
   wherein the pulverizing agent also adds moisture content to the admixture, thereby inhibiting aerial particulate suspension and escape of the particulates upon opening of a lid of the blending chamber.

2. The method as described in claim 1 wherein the given size is less than or equal to 2 mm.

3. The method as described in claim 1 wherein the given power range is 240-2400 W.

4. The method as described in claim 3 wherein the given power range is greater than 450 W and less than 2400 W.

5. The method as described in claim 1 wherein the blending chamber is translucent or transparent.

6. The method as described in claim 5 further including recording the blending to produce a proof of destruction.

7. The method as described in claim 1 wherein the pulverizing agent is a corn-based filler material.

8. The method as described in claim 7 wherein the corn-based filler material comprises popcorn seeds.

9. The method as described in claim 1 wherein the given time period is between one (1) and thirty (30) minutes.

10. The method as described in claim 1 further including cutting the SSD PCB into pieces prior to blending.

11. The method as described claim 1 wherein the blending operation is repeated using the particulate powder together with any particulates greater than the given size.

12. The method as described in claim 1 further including covering the blending chamber during the blending.

13. The method as described in claim 12 further including sealing a cover to the blending chamber to prevent escape of particulates.

14. The method as described in claim 1 further including covering the blending chamber with a glove bag to inhibit aerial dissemination of the particulates.

15. The method as described in claim 1 wherein the sieve evaluates whether any particulates greater than the given size exist following an iteration of the blending.

16. A method of disintegration of an electronic memory that stores information, comprising:
   receiving a solid state drive (SSD) device;
   separating an SSD printed circuit board (PCB) from the solid state drive device;
   cutting the SSD PCB into pieces;
   admixing the pieces of an SSD PCB together with a pulverizing agent to form an admixture;
   blending, for a given time period, and within a blending chamber, the admixture to form a particulate powder, wherein the blending is carried out over a given power range;
   following the given time period, testing the particulate powder to determine whether any particulates greater than a given size exist; and
   based on the testing, repeating at least the blending operation until such time as no particulates greater than the given size exist in the admixture;
   wherein the pulverizing agent also adds moisture content to the admixture, thereby inhibiting aerial particulate suspension and escape of the particulates upon opening of a lid of the blending chamber.

17. The method as described in claim 16 wherein the given size is less than 2 mm.

18. The method as described in claim 16 wherein the given power range is 240-2400 W.

19. The method as described in claim 18 wherein the given power range is greater than 450 W and less than 2400 W.

* * * * *